United States Patent [19]
Press

[11] Patent Number: 6,105,214
[45] Date of Patent: Aug. 22, 2000

[54] WATER RESISTANT SLIDE FASTENER AND PROCESS FOR PREPARING SAME

[76] Inventor: Stuart Press, 42 Academy St., New Haven, Conn. 06511

[21] Appl. No.: 09/160,651

[22] Filed: Sep. 25, 1998

[51] Int. Cl.$^7$ .................................................. A44B 19/32
[52] U.S. Cl. ............................. 24/389; 24/384; 24/398; 24/408
[58] Field of Search ........................ 24/389, 394, 403, 24/384, 398, 397, 408

[56] References Cited

U.S. PATENT DOCUMENTS

| | | | |
|---|---|---|---|
| 3,764,437 | 10/1973 | Heimberger | 24/389 |
| 3,914,827 | 10/1975 | Brown et al. | 24/389 |
| 4,488,338 | 12/1984 | Takahashi | 24/408 |
| 4,674,422 | 6/1987 | Boser . | |
| 4,714,038 | 12/1987 | Boser . | |
| 4,724,586 | 2/1988 | Tsubokawa et al. | 24/389 |
| 4,888,859 | 12/1989 | Horita . | |
| 4,930,835 | 6/1990 | Bruce et al. . | |
| 5,003,902 | 4/1991 | Benstock et al. | 24/384 |
| 5,008,986 | 4/1991 | Laudet et al. . | |
| 5,119,530 | 6/1992 | Murabayashi et al. | 24/389 |
| 5,159,719 | 11/1992 | Aumann . | |
| 5,231,736 | 8/1993 | Hohenocker et al. . | |
| 5,386,616 | 2/1995 | Norvell . | |
| 5,400,441 | 3/1995 | Yoshida . | |
| 5,444,898 | 8/1995 | Norvell . | |
| 5,709,766 | 1/1998 | Press et al. . | |

FOREIGN PATENT DOCUMENTS 2125886  3/1984  United Kingdom ..................... 24/389

OTHER PUBLICATIONS

Federal Test Method Std., No. 191A, Method 5204, Dated Jul. 20, 1978, Stiffness of Cloth, Directional; Self–Weighted Cantilever.

Federal Test Method Std., No. 191A, Method 5302, Dated Jul. 20, 1978, Abrasion Resistance of Cloth; Inflated Diaphragm.

Federal Test Method Stds, No. 191A, Method 5970, Dated Jul. 20, 1978, Adhesion of Coating; Adhesive Method.

*Primary Examiner*—Victor N. Sakran
*Attorney, Agent, or Firm*—Bachman & LaPointe, P.C.

[57] ABSTRACT

A water resistant slide fastener, including a pair of stringer tapes each having first and second opposed surfaces and each having a series of gripper elements positioned along edges of said first surface; and a water resistant layer on said second surfaces, wherein said water resistant layer has an adhesion to said stringer tapes of at least about 6 lb/in.

24 Claims, 5 Drawing Sheets

WATER RESISTANT SLIDE FASTENER AND PROCESS FOR PREPARING SAME

BACKGROUND OF THE INVENTION

The invention relates to a water resistant slide fastener and to a process for preparing same.

Numerous water resistant articles such as high-performing outerwear, jackets, coats, pants, gloves, back packs, daypacks, tents and the like are used in a wide variety of environments and applications. These articles are typically made of water proof or water-resistant material as desired, but also typically require closures or slide fasteners such as zippers and the like which can be a source of leakage.

A number of proposals have been made to address this problem. Examples of such efforts include U.S. Pat. Nos. 4,888,859, 5,386,616 and 5,444,898.

U.S. Pat. No. 4,888,859 to Morita involves the positioning of a filling core in spaces or gaps defined by the gripping elements of a slide fastener. The core is said to swell when contacted by water so as to prevent entry of liquid into the garment. This type of slide fastener has also been used with a hydrophobic core. The back surface of the '859 slide fastener is solution coated with a layer of polyurethane resin.

A problem with the '859 fastener is that the fastener must be positioned with the polyurethane coating on the inside surface so as to protect the coating from abrasion and the like. Unfortunately this exposes the fastener structure or coils to outside wear and abrasion, can detract from the appearance of the slide fastener in the garment, and does not give the appearance of a water resistant closure to consumers.

Further, with the coating positioned inside a garment or article, it is undesirable to tape to the coating material as the material has insufficient adhesion to the underlying stringer tapes, and this adhesion drops after laundering.

Positioning of this fastener with the coating facing outward, however, also leads to problems as the coating does not stand up to abrasion, which leads to loss of performance and leakage.

U.S. Pat. No. 5,386,616 to Norvell describes a water resistant closure wherein a water resistant coating is applied to the stringer tapes of a slide fastener, and water repellant treatment is relied upon for the actual gripper structure. Unfortunately, such treatments have been found to break down when subjected to wear, tear and soiling. Therefore, the slide fastener of Norvell '616 is not suitable as the primary water resistant, and additional flaps or other structures of the garments are required. Furthermore, consumers are uncomfortable with water protection that cannot be seen, and there is therefore a low perceived value to invisible barriers such as fluorocarbon treatment and the like.

An alternative approach is disclosed in U.S. Pat. No. 5,444,898 which discloses a slide fastener wherein an internal flap is arranged to pass behind the actual grippers of the slide fastener so as to resist water seepage therethrough, and an additional flap is positioned to pass in front of the coils of the fastener structure. Although this structure serves to enhance the water resistance of the fastener, the extra flaps make for a structure which can be cumbersome and bulky, and is therefore undesirable for use with articles where flexibility is critical such as for example, "pit-zips" of high performing outerwear.

The need remains for a simple and durable slide fastener which is resistant to passage of water while maintaining a pleasing appearance without the need for additional flaps or other structure and further while resisting breakdown due to outside abrasion.

It is therefore the primary object of the present invention to provide a water resistant slide fastener which provides excellent resistance to passage of water.

It is a further object of the present invention to provide such a water resistant slide fastener which is resistant to damage due to abrasion and the like.

It is still another object of the present invention to provide a water resistant slide fastener having a water resistant layer which has excellent resistance to abrasion and loss of adhesion.

It is still another object of the present invention to provide a water resistant slide fastener which can be easily incorporated into water resistant articles or garments through a variety of methods including direct heat-sealing without securing.

Other objects and advantages of the present invention will appear hereinbelow.

SUMMARY OF THE INVENTION

In accordance with the present invention, the foregoing objects and advantages have been readily attained.

According to the invention, a water resistant slide fastener is provided which comprises a pair of stringer tapes each having first and second opposed surfaces and each having a series of gripper elements positioned along edges of said first surface; and a water resistant layer on said second surface, wherein said water resistant layer has an adhesion to said stringer tapes of at least about 6lb/in.

In further accordance with the invention, the water resistant layer more preferably has an adhesion to the stringer tapes of at least 25lb/in.

Advantageously, the polyurethane layer is capable of withstanding significant abrasion, at least about 200 Stoll abrasion cycles, without perforation, thereby providing a slide fastener which can be positioned in garments with the polyurethane layer oriented facing outwardly.

BRIEF DESCRIPTION OF THE DRAWINGS

A detailed description of preferred embodiments of the invention follows, with reference to the attached drawings, wherein.

DETAILED DESCRIPTION

The invention relates to a water resistant slide fastener, particularly to a slide fastener which is effective in resisting passage of water and the like and which can easily be positioned in closures of water resistant articles without the need for sealing flaps or water absorptive wicks or cores, and which has a water resistant polyurethane layer which is extremely resistant to abrasion and the like, and which has a very durable bond to the fabric of the stringer tapes. This allows the slide fastener to be positioned with the water resistant layer facing outward in a water resistant article or garment.

Figure 1:
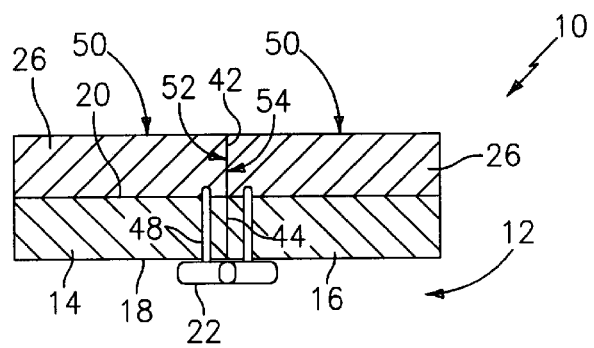
FIG. 1 is a sectional view of a slide fastener according to the invention.

FIG. 1 shows a sectional view of a slide fastener 10 in accordance with the present invention. Slide fastener 10 includes a slide fastener structure 12, and stringer tapes 14, 16 each having opposed surfaces 18, 20. A gripper or coil structure 22 of slide fastener structure 12 is attached to edges of opposed surfaces 18, for example using stitches 48. Slide fastener 10 in accordance with the present invention has laminated to surfaces 20 of stringer tapes 14, 16, a sheet, film or layer 26 of water resistant material, preferably a polyurethane film.

Polyurethane film is preferably laminated, transfer coated, or transfer laminated to stringer tapes 14, 16 as a solid sheet and provided with cut line 42 so as to provide a parting line for film 26 which is substantially coincident with parting line 44 of stringer tapes 14, 16. Film 26 and cut line 42 are preferably provided so as to provide sections 50 of film 26 each having end surfaces 52, 54 which are reasonably square in nature so as to provide contact or near contact between end surfaces 52, 54 which serve advantageously to provide excellent resistance to permeation of water.

This structure of slide fastener 10 is particularly advantageous in that the bonding process provides film 26 laminated to stringer tapes 14, 16 with excellent adhesion strength and resistance to abrasion while maintaining a flexible, soft, and supple closure. This adhesion strength and abrasion resistance advantageously allows for slide fastener 10 to be positioned with film 26 oriented facing outward on an article or garment, so as to shield gripper elements 22, threads 48 and stringer tapes 14, 16 from exposure to outside wear and tear. This is advantageous from both a leakage and a wear standpoint, and cannot practically be done using conventionally applied coatings or films which are rapidly rendered ineffective by normal wear and tear or are too thick and result in a fastener which is not sufficiently flexible or easily operable due to high coefficient of friction. Further, this orientation of slide fastener 10 in accordance with the present invention allows for complete elimination of additional closure flaps and the like which are cumbersome to use and can reduce flexibility along slide fastener 10 as well as flexibility of the garment overall. Slide fastener 10 according to the present invention including laminated layer 26 of polyurethane is advantageous over structures such as that disclosed in the aforesaid U.S. Pat. No. 4,888,859, wherein polyurethane is believed to be solution-coated to the stringer tape, in that the laminated layer 26 in accordance with the present invention has a markedly greater adhesion strength to the stringer tapes 14, 16 and further has excellent abrasion resistance as compared to such solution coating.

Lamination of a solid sheet of water resistant material to stringer tapes 14, 16 also advantageously provides for uniform coverage of stitches 48, which are frequently insufficiently covered using a solution-coating process. Furthermore, the location of such stitches is frequently the area where abrasion first penetrates the water resistant film, thereby exposing a critical element of the entire device. Damage to stitching 48 which can result from exposure through an abraded water resistant layer can result in separation of gripper elements 22 from stringer tapes 14, 16, thereby completely destroying the effectiveness of slide fastener 10.

As will be demonstrated below, laminated coating 26 advantageously exhibits an adhesion strength as measured by Federal Test Standard 191A, Method No. 5970, of at least about 6 pounds per inch of width of heat seal peel adhesion, and more preferably at least about 10 pounds per inch of width, most preferable at least about 25 pounds per inch of width. Such adhesion is a marked improvement over the solution coated structures of the prior art, which delaminate at an adhesion strength less than 6 pounds per inch of width.

Furthermore, the laminated layer 26 in accordance with the present invention has excellent resistance to abrasion. As will be demonstrated below, laminated layer 26 according to the invention readily resists over 1000 cycles of Stoll abrasion testing (Federal Test Standard 191A, Method No. 5302) without any significant loss of structural integrity, while prior art coatings show noticeable wear and perforation after only 200 cycles. Laminated layer 26 is bonded to the fabric of stringer tapes 14, 16 in such a way that repeated laundering does not significantly impact upon the adhesion strength or abrasion resistance, thereby providing a slide fastener wherein the polyurethane surface can be positioned outwardly, and subjected to normal wear and tear, without presenting problems such as early structural failure of the water resistant layer, and further without the layer being damaged or impacted so as to present an undesirable appearance.

As used herein, the abrasion cycles referred to are cycles of abrasion using a Stoll abrasion tester operating with a No. 8 cotton duck unbleached material having a weight of about 18 ounces per square yard and an approximate thread count of about 44×30 threads per inch as an abrader, with the sample being tested while oriented in the machine in the warp direction, and with a one pound weight on the head of the abrader device. Such abrasion testing is further illustrated in the Example below. Suitable abrader can be obtained from Burcott Mills of Chicago, Ill.

Slide fastener structure 10 according to the present invention includes layer 26 laminated to stringer tapes 14, 16 with sufficient adhesion strength that when this structure is subjected to adhesion testing such as method 5970 of Federal Test Method Standard No. 191A, the polyurethane bond to the fabric of the stringer tapes has a higher strength than the integrity or material strength of the actual stringer tapes, and therefore, under this test, failure occurs through the stringer tape material, and not along the bond between the polyurethane and stringer tapes.

Inner surface or non-coated surface 18 of stringer tapes 14, 16 may be treated with water repellant treatments such as fluorocarbon treatments, if desired. This may assist in providing a thoroughly water-resistant article. However, long term water resistance is nevertheless provided primarily by the water resistant layer 26.

In applications where the slide fastener of the present invention must be flexible, for example when used as a "pit-zip" or positioned elsewhere in a high performing outerwear garment, the slide fastener structure must remain sufficiently flexible so as not to interfere with the free movement of the wearer of the garment. A suitable slide fastener according to the invention, for a No. 5 zipper, will have a flexibility as measured by Clark Stiffness Testing of less than or equal to about 30 cm, more preferably less than or equal to about 25 cm, as set forth in Federal Test Method Standard 191A, Method 5204.

Figure 2:
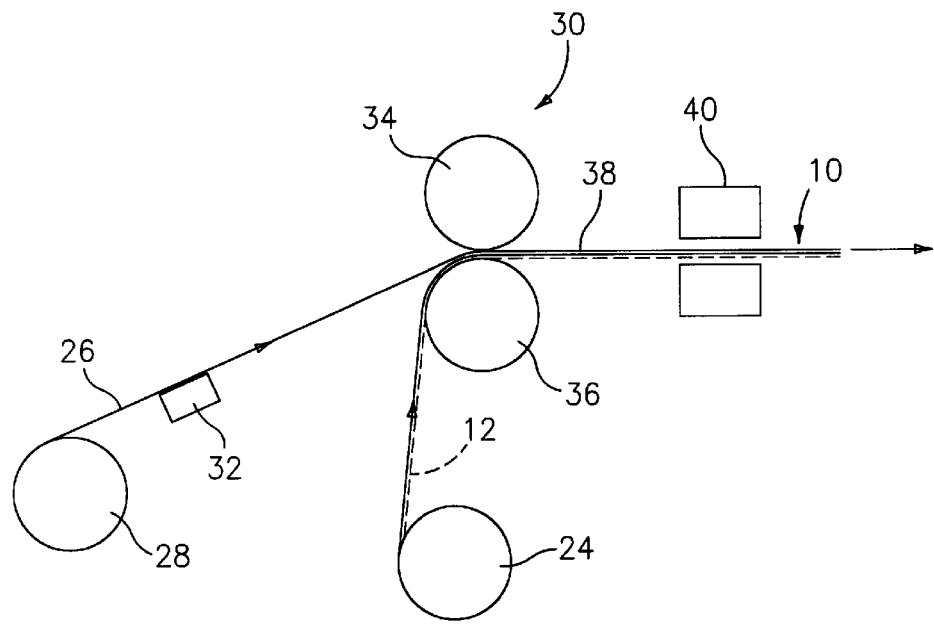
FIG. 2 is a side schematic view of a process for preparing a slide fastener in accordance with the present invention.
Figure 3:
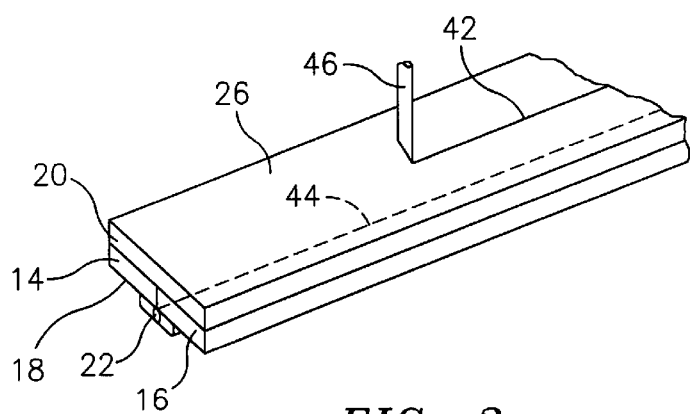
FIG. 3 is a perspective view of a section of slide fastener in accordance with the present invention including illustration of a cutting step in accordance with a preferred embodiment.

Referring to FIG. 2, a process for preparing a slide fastener 10 in accordance with the present invention is schematically illustrated. As shown, a slide fastener structure 12 is provided which typically includes two stringer tapes 14, 16 (see FIG. 3) each having opposed surfaces 18, 20, and having a gripper structure 22 such as coils, teeth, knobs and the like which can be engaged and disengaged using a slide member (not shown) so as to join stringer tapes 14, 16 as desired.

In accordance with the present invention, slide fastener structure 12 may suitably be provided having stringer tapes 14, 16 arranged in a substantially parallel configuration, with gripper structure 22 arranged on one opposed surface 18 thereof, or along inner edges of tapes 14, 16. Slide fastener structure 12 may, for example, be provided from a roll 24 of suitable slide fastener structure as schematically shown in FIG. 2.

Still referring to FIG. 2, a sheet or layer of water resistant film, preferably polyurethane film, is provided and bonded or laminated to opposed surfaces 20 of stringer tapes 14, 16 so as to provide the desired water resistant slide fastener structure 10 in accordance with the present invention.

As shown in FIG. 2, polyurethane film 26 is preferably provided, for example from a roll 28, and fed toward a laminating station 30 where it is laminated or bonded to slide fastener structure 12. Before reaching laminating station 30, one surface of polyurethane film 26 may be treated for example at station 32 so as to provide a polyurethane adhesive or bonding material on the surface of polyurethane film to be contacted with opposed surface 20 of slide fastener structure 12 which can then readily be laminated together at laminating station 30.

The adhesion of the present invention may, if desired, be provided by applying a bonding agent or hot melt adhesive to the polyurethane film before lamination.

Figure 4:
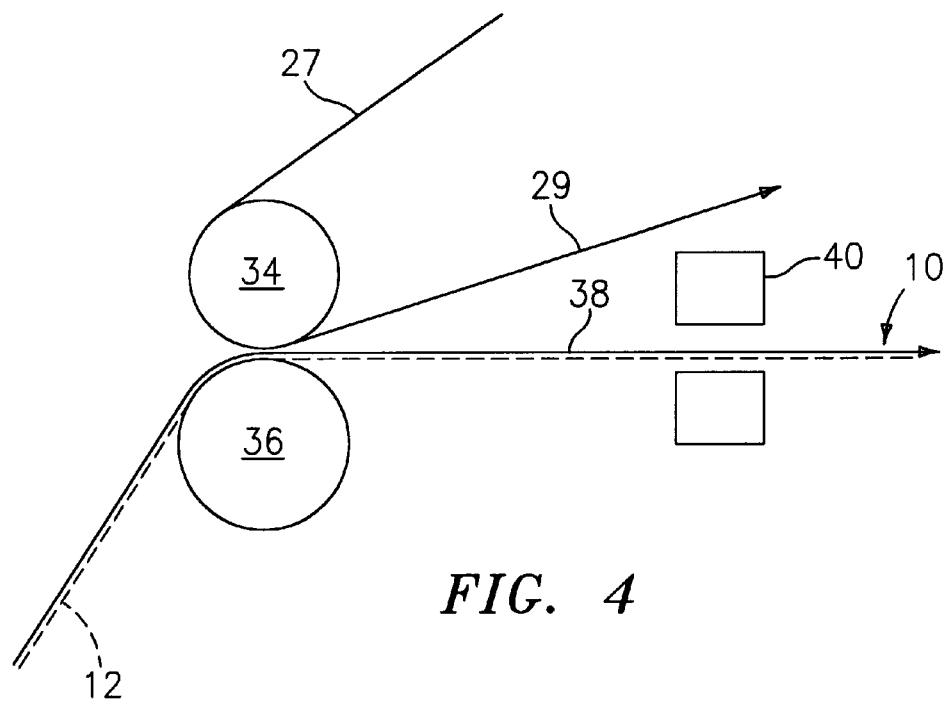
FIG. 4 schematically illustrates an alternative process for applying solid water resistant film in accordance with the present invention.

Referring to FIG. 4, a transfer laminating method which can be used in accordance with the present invention for applying water resistant film to stringer tapes of a slide fastener is illustrated. As shown, nip rollers or laminating rollers 34, 36 are provided as in the embodiment of FIG. 2, and slide fastener structure 12 is fed to rollers 34, 36 as discussed previously. In this embodiment, water resistant film is provided by feeding a sheet of paper or other suitable material to nip rollers 34, 36 which is carrying the desired layer of polyurethane or other water resistant material. This combination of polyurethane and paper is referred to in FIG. 4 by reference numeral 27. Structure 27 is fed such that the layer of polyurethane faces slide fastener structure 12 while passing through rollers 34, 36, and during rolling, the polyurethane is transferred from the paper of structure 27 to slide fastener structure 12 as desired. As shown in FIG. 4, a sheet of paper 29 without polyurethane exits rollers 34, 36, as does laminated slide fastener 38 as desired in accordance with the present invention. Laminated or coated structure 38 may subsequently be fed to a cutting station 40 as with the embodiment of FIG. 2, if desired. Such cutting, however, is preferably carried out in a separate process. FIGS. 2 and 4 show this cutting in-line for the sake of simplicity only. A curing step may also be desired after laminating and could be performed at station 40 or in any other convenient manner.

In this manner, polyurethane film can be directly laminated to the fabric stringer tapes 14, 16, particularly to opposed surfaces 20 thereof, in a manner which provides a very durable, abrasion-resistant, thin and flexible polyurethane coating on surface 20. This layer 26 of polyurethane also has an excellent adhesion to surface 20 which resists delamination, even after multiple washings. If desired, additional layers of polyurethane and the like can easily be laminated to the initial polyurethane film coating, so as to provide the water resistant slide fastener 10 of the present invention with additional properties if needed.

Referring back to FIG. 1, it is preferred in accordance with the present invention that layer or film 26 of water resistant material be provided so as to substantially overlay both the inner edges of stringer tapes 14, 16 as well as gripper coils 22. This is readily accomplished by laminating a solid sheet or layer of polyurethane or other water resistant material to the desired surface 20 of stringer tapes 14, 16, and subsequently forming a cut along line 42 where illustrated. After substantial use, a small gap may eventually develop between surfaces 52, 54 of polyurethane material 26. However, such gap will typically be less than about 0.5 mm, and will not effect the proper operation of polyurethane layer 26 in accordance with the present invention.

Figure 5:
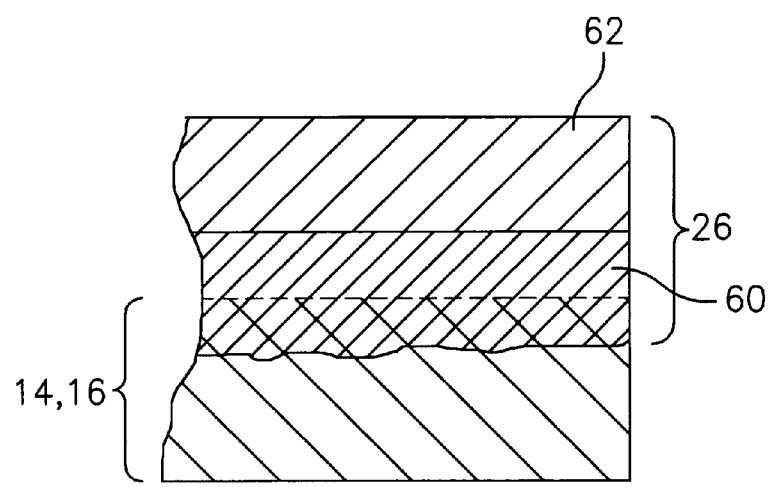
FIG. 5 illustrates an enlarged portion of a slide fastener in accordance with a preferred embodiment of the present invention.

Referring now to FIG. 5, a preferred embodiment of the present invention will be further illustrated and described. As set forth above, it may be desirable to provide film 26 as a multilayer structure. FIG. 5 shows film 26 having an inner layer 60 arranged contacting stringer tapes 14, 16 and an outer layer 62 arranged facing away from stringer tapes 14, 16. In accordance with the present invention, inner layer 60 may preferably be a low melt material, for example having Shore A hardness of less than or equal to about 80 PTPU, while outer layer 62 is provided as an abrasion resistant layer, and may be provided having a hardness preferably greater than or equal to about 90 PTPU. The combined thickness of layer 26 may be provided preferably between about 1 and about 5 mils, more preferably between about 2 and about 2½ mils. In the multilayer embodiment of the present invention, each layer 60, 62 may suitably be provided having a thickness of about 1.5 mils.

As shown in FIG. 5, the laminating process of the present invention results in a portion of film 26, preferably a portion of a low melt layer 60 of film 26, embedding into the material of stringer tapes 14, 16. This is shown by the overlap in FIG. 5 of layer 60 with stringer tapes 14, 16. The permeation of film material into the fibers of stringer tapes 14, 16 provided by such lamination serves to provide the excellent adhesion demonstrated by slide fastener 10 in accordance with the present invention and reduces the coefficient of friction to allow for ease of operation. Incorporating a slip agent into the hard layer is also beneficial in this regard. Furthermore, the provision of a hard or abrasion resistant outer layer 62 of film 26 serves to advantageously enhance the abrasion resistance as demonstrated by slide fastener 10 in accordance with the present invention and reduces the coefficient of friction to allow for ease of operation. Of course, it should be appreciated that additional layers may be incorporated into film 26, if desired.

The water resistant film in accordance with the present invention may be provided of any acceptable material. Specific examples of acceptable material include polyurethane, polyester, polyolefin, nylon, rubber and other thermoplastic hot melt adhesive films.

The present disclosure is made in terms of polyurethane as the water resistant material, which is the preferred embodiment. Of course, other materials as described above could be equally suitable. It should also be noted that the polyurethane or other water resistant material could include other additives such as pigments, anti-oxidants, slip agents and the like, depending upon specific details of the application.

Stringer tapes 14, 16 in accordance with the present invention are typically provided from a woven or non-woven fabric, preferably a woven fabric, and may suitably be provided from materials such as polyester yarn, nylon yarn, aramid yarn, and the like.

The water resistant film 26 in accordance with the present invention is preferably polyurethane film, although other urethane and similar water resistant films may be used in accordance with the present invention. The preferred polyurethane film in accordance with the present invention has a total thickness of between about 1 and about 5 mils, most preferably at least about 2 mils. Various types and grades of polyurethane and other thermoplastic films are readily available and should be selected depending upon the desired characteristics of the final slide fastener product.

From laminating station 30, (FIG. 2) polyurethane coated slide fastener structure 38 may suitably be passed to subsequent treating station 40 wherein the polyurethane film 26 may be cured, and/or cut, preferably along a line 42 (FIG. 3) which is substantially parallel to a parting line 44 of gripper structure 22. This may be carried out using a simple knife structure 46 (see FIG. 3), or with any other similar structure. Providing cut line 42 after laminating film 26 to stringer tapes 14, 16 serves to provide a reasonably squared edge of flat surface 52 (FIG. 1) of polyurethane film which contacts or closely abuts the other squared edge or surface 54 thereof when water resistant slide fastener 10 is closed in accordance with the present invention. This serves advantageously to provide excellent resistance to passage of water through the gripper structure 22 of water resistant slide fastener 10.

The present invention provides a water resistant coated slide fastener structure 10 having a water resistant polyurethane layer laminated thereto, with excellent adhesion to the stringer tape fabric, thereby providing a slide fastener structure 10 which can advantageously be positioned, for example in an article of clothing, with polyurethane layer 26 facing outwardly in the garment. This would not normally be possible with conventionally coated slide fastener structures, as such coatings are susceptible to removal by abrasion, laundering and other wear and tear, and therefore must be oriented facing inwardly on articles of clothing, or otherwise covered using flaps or other structures. This is particularly advantageous in that positioning of polyurethane coated surfaces 20 facing outward in a garment (1) increases long term abrasion resistance of the coil structure and stitching, (2) provides a higher perception of water resistance due to the visible structural covering of the coil by the polyurethane film, (3) provides increased water resistance, and (4) can also avoid water wicking through or laterally into the garment through the stringer tapes as is allowed by some prior art structures. Slide fastener 10 of the present invention also completely avoids the frequently cumbersome flaps which are used in accordance with the prior art and which add weight and stiffness. Also, the substantial abutting nature of polyurethane coat or film along cut line 42 parallel to parting line 44 of gripper structure 22, provides excellent resistance to water flow through gripper structure 22. Further, such positioning also positions gripper coils 22 and the yarns that stitch them in an inside shielded position.

EXAMPLE

Two samples were prepared for use in this example. Sample 1 was a YKK slide fastener having a solution-coat of polyurethane. Sample 2 was a slide fastener laminated with a 2.5 mil layer of polyurethane in accordance with the present invention. Each sample was radio frequency (RF) sealed to a 6 ounce polyurethane coated nylon using a Sealomatic RF sealing machine set at 45 psi of compressed air and using a 1"×4" bar. The sealing was performed using an 8 second dwell time and a 3 second cooling time. The slide fastener samples were sealed to the nylon material in this manner, with the urethane-coated surface of the slide fastener contacting the polyurethane coated surface of the nylon material. The adhesion between the polyurethane coat and slide fastener fabric material was then tested by subjecting each sample to an adhesion test as specified by Federal Standard 191A, Method 5970. The RF seal was sufficient to bond the polyurethane coated nylon to the urethane coated slide fastener for the purposes of this test without the need for additional adhesive. Samples prepared as described above were also subjected to 5 laundering cycles using household laundry detergent at warm water wash/warm water rinse and warm drying cycles. The laundered samples were then subjected to adhesion testing. The results are set out in Table 1.

TABLE 1

| | Adhesion Strength | | |
|---|---|---|---|
| | Initial (lb/in) | 5 Cycles Laundering (lb/in) | % Drop |
| Sample 1 (Prior Art) | 5 | 3.6 | 28 |
| Sample 2 | 40 | 38.4 | 4 |

The urethane coated side of each sample was also subjected to Stoll abrasion testing in accordance with Federal Test Method Standard No. 191A, Method 5302, to determine the abrasion resistance of the polyurethane coating. Each sample was subjected to abrasion cycles using an inflated diaphragm abrasion tester with a No. 8 cotton duck unbleached material having a weight of 18 ounce per square yard as the abradant.

Figure 6:
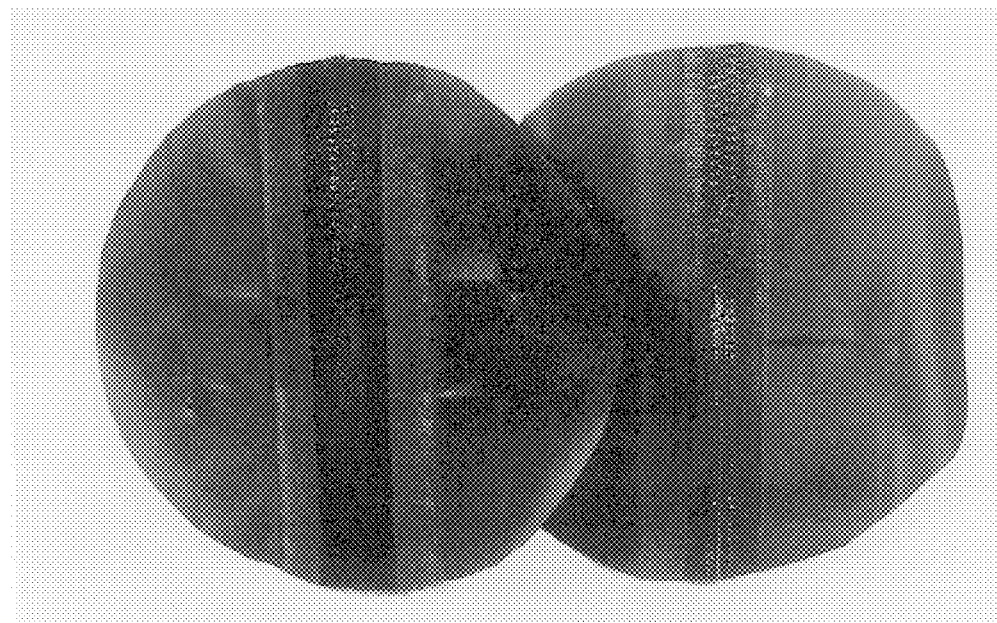
FIG. 6 is a side-by-side comparison of a slide fastener according to the present invention as compared to a slide fastener according to the prior art, and showing the polyurethane coating or layer after being subjected to a Stoll abrasion test of 1100 cycles.
Figure 7:
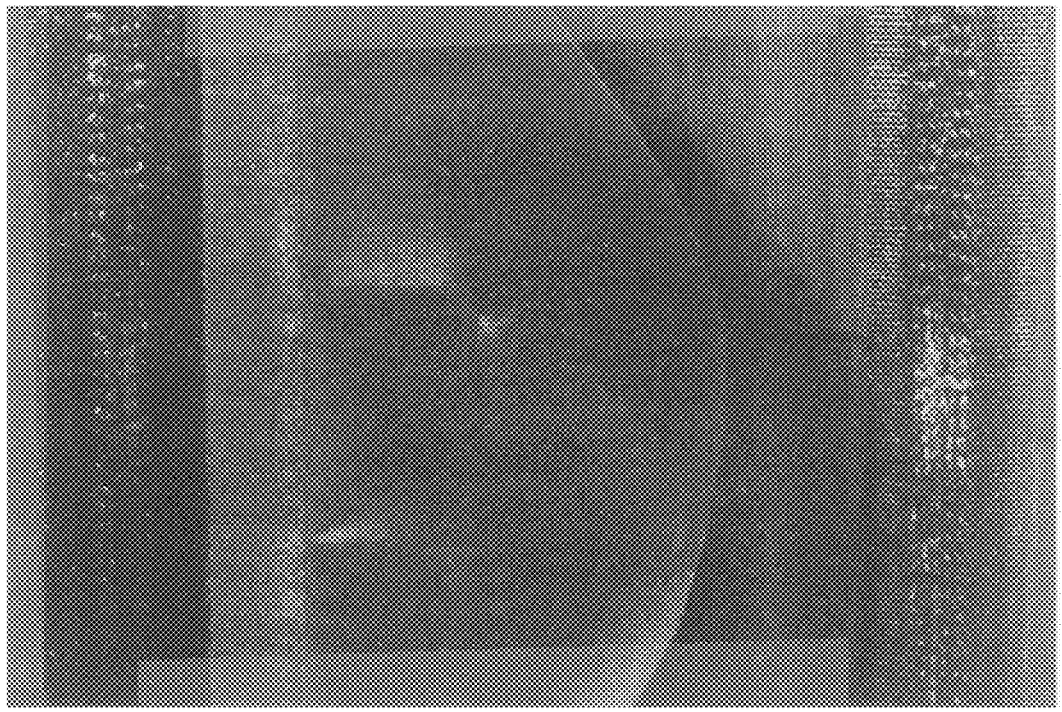
FIG. 7 is an enlargement of the illustration of FIG. 6 showing more detail of the abraded portions.
Figure 8:
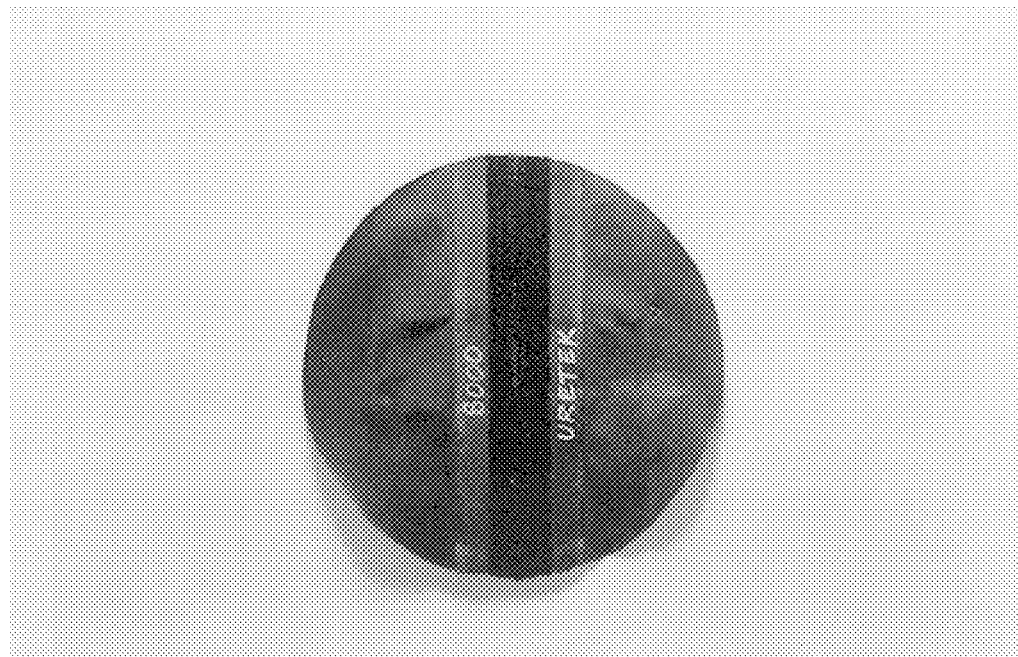
FIG. 8 shows a sample according to the present invention which has been subjected to 8000 abrasion cycles and remains in excellent condition.

The results of the abrasion testing are set forth in Table 2 below. FIGS. 6 and 7 show Sample 1 on the right and Sample 2 on the left after 1,100 cycles. FIG. 8 shows Sample 2 after 8,000 cycles.

TABLE 2

| | Stoll Abrasion | | | | |
|---|---|---|---|---|---|
| | Cycles | | | | |
| | 200 | 500 | 1000 | 5000 | 8000 |
| Sample 1 (Prior Art) | Noticeable wear, slight perforation | Significant perforation | Test Stopped | — | — |
| Sample 2 | Intact | Intact | Intact | Intact | Slight wear visible |

As set forth above (Table 1), the laminated slide fastener structure of the present invention demonstrated an adhesion strength strikingly greater than that of solution coated material. By contrast, the prior art solution coated fastener separated cleanly along the interface between polyurethane and fabric, and had an adhesion strength substantially smaller than that of the slide fastener of the present invention. After laundering, the slide fastener of the present invention (Sample 2) exhibited an adhesion strength of 38.4 lb/in, and lost only 4% of on the initial strength, while the adhesion strength of the prior art solution-coated material (Sample 1) had dropped 28% to 3.6 lb/in.

As demonstrated in Table 2 and in the accompanying FIGS. 6, 7 and 8, the polyurethane laminated structure of the present invention also exhibited excellent resistance to abrasion, and remained intact after being subjected to 800 abrasion cycles, while the conventionally solution coated slide fastener was perforated after only 200 cycles. Such abrasion would undesirably impact upon the visual appearance of the slide fastener, and adversely impact upon the capability of this structure to resist flow of water.

Clearly, the laminated polyurethane structure of the present invention shows far superior adhesion strength and abrasion resistance as compared to the conventional solution-coated material.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A water resistant slide fastener, comprising:
   a pair of stringer tapes each having first and second opposed surfaces and each having a series of gripper elements positioned along edges of said first surface; and
   a water resistant layer on said second surfaces, wherein said water resistant layer has an adhesion to said stringer tapes of at least about 6 lb/in, wherein said stringer tapes are arranged substantially parallel having inner edges substantially adjacent to said series of grippers elements, and wherein said water resistant layer is positioned on said second surfaces and overlying said inner edges and said series of gripper elements.

2. A slide fastener according to claim 1, wherein said water resistant layer has an adhesion to said stringer tapes of at least about 10 lb/in.

3. A slide fastener according to claim 1, wherein said water resistant layer has an adhesion to said stringer tapes of at least about 25 lb/in.

4. A slide fastener according to claim 1, wherein said water resistant layer is capable of withstanding at least about 200 Stoll abrasion cycles without perforation.

5. A slide fastener according to claim 1, wherein said water resistant layer is capable of withstanding at least about 500 Stoll abrasion cycles without perforation.

6. A slide fastener according to claim 1, wherein said water resistant layer is capable of withstanding at least about 1000 Stoll abrasion cycles without perforation.

7. A slide fastener according to claim 1, wherein said water resistant layer has a thickness of at least about 1 mil.

8. A slide fastener according to claim 1, wherein said water resistant layer has a thickness of at least about 2 mils.

9. A slide fastener according to claim 1, wherein said water resistant layer has an adhesion to said stringer tapes which is greater than the integral strength of said stringer tapes, whereby said stringer tapes fail before separation of said water resistant layer from said stringer tapes.

10. A slide fastener according to claim 1, wherein said water resistant layer comprises a polyurethane film.

11. A slide fastener according to claim 10, wherein said polyurethane film comprises a multilayer structure including an inner layer arranged facing said stringer tapes and having a shore A hardness of less than or equal to about 80 PTPU, and having an outer layer having a Shore A hardness greater than or equal to about 90 PTPU.

12. A slide fastener according to claim 11, wherein said inner layer has a portion embedded into said stringer tapes.

13. A slide fastener according to claim 11, wherein said inner layer and said outer layer each have a thickness of about 1.5 mils.

14. A water resistant slide fastener, comprising:
   a pair of stringer tapes each having first and second opposed surfaces and each having a series of gripper elements positioned along edges of said first surface; and
   a water resistant layer on said second surfaces, wherein said water resistant layer is capable of withstanding at least about 200 stoll abrasion cycles without perforation, wherein said stringer tapes are arranged substantially parallel having inner edges substantially adjacent to said series of gripper elements, and wherein said water resistant layer is positioned on said second surfaces and overlying said inner edges and said series of gripper elements.

15. A slide fastener according to claim 14, wherein said water resistant layer is capable of withstanding at least about 500 Stoll abrasion cycles without perforation.

16. A slide fastener according to claim 14, wherein said water resistant layer is capable of withstanding at least about 1000 Stoll abrasion cycles without perforation.

17. A slide fastener according to claim 14, wherein said water resistant layer comprises a polyurethane film.

18. A slide fastener according to claim 17, wherein said polyurethane film comprises a multilayer structure including an inner layer arranged facing said stringer tapes and having a Shore A hardness of less than or equal to about 80 PTPU, and having an outer layer having a Shore A hardness greater than or equal to about 90 PTPU.

19. A slide fastener according to claim 18, wherein said inner layer has a portion embedded into said stringer tapes.

20. A slide fastener according to claim 18, wherein said inner layer and said outer layer each have a thickness of about 1.5 mils.

21. A water resistant slide fastener, comprising:
   a pair of stringer tapes each having first and second opposed surfaces, said stringer tapes being positioned substantially parallel and side-by-side so as to provide said stringer tapes with inner and outer edges;
   a series of gripper elements positioned along said inner edges for releasably securing said stringer tapes together; and
   a water resistant layer on at least one surface of said first and second surfaces and overlying said inner edges and said series of gripper elements, wherein said water resistant layer comprises a polyurethane film having a multilayer structure including an inner layer arranged facing said stringer tapes and having a first shore A hardness, and an outer layer having a second shore A hardness, wherein said second shore A hardness is greater than said first shore A hardness.

22. A slide fastener according to claim 21, wherein said first shore A hardness is less than or equal to about 80 PTPU and said second shore A hardness is greater than or equal to about 90 PTPU.

23. A water resistant slide fastener, comprising:

a pair of stringer tapes each having first and second opposed surfaces and each having a series of gripper elements positioned along edges of said first surface; and a water resistant layer on said second surfaces, wherein said slide fastener exhibits a Clark stiffness of less than or equal to about 30 cm, wherein said stringer tapes are arranged substantially parallel having inner edges substantially adjacent to said series of gripper elements, and wherein said water resistant layer is positioned on said second surfaces and overlying said inner edges and said gripper elements.

24. A water resistant slide fastener, comprising:

a pair of stringer tapes each having first and second opposed surfaces and each having a series of gripper elements positioned along edges of said first surfaces; and a water resistant layer on said second surfaces, wherein said water resistant layer has an adhesion to said stringer tapes of at least about 6 lb/in, wherein said water resistant layer has an adhesion to said stringer tapes which is greater than the integral strength of said stringer tapes, whereby said stringer tapes fail before separation of said water resistant layer from said stringer tapes.

* * * * *